United States Patent [19]

Hashiue et al.

[11] Patent Number: 4,569,903

[45] Date of Patent: Feb. 11, 1986

[54] OPTICAL RECORDING MEDIUM

[75] Inventors: Masakazu Hashiue; Koji Ochiai, both of Tokyo, Japan

[73] Assignee: Fuji Photo Film Co., Ltd., Kanagawa, Japan

[21] Appl. No.: 664,938

[22] Filed: Oct. 25, 1984

Related U.S. Application Data

[63] Continuation of Ser. No. 395,239, Jul. 6, 1982, abandoned, which is a continuation of Ser. No. 120,036, Feb. 11, 1980, abandoned.

[51] Int. Cl.⁴ .................................................. G03C 5/16
[52] U.S. Cl. ....................... 430/350; 430/21; 430/416; 430/523; 430/533; 430/495; 430/945; 346/76 L
[58] Field of Search ............... 430/1, 2, 9, 21, 350, 430/352, 321, 416, 523, 533, 495, 568, 945, 948, 961; 358/128, 130; 346/135.1, 137, 76 L

[56]        References Cited

U.S. PATENT DOCUMENTS

| | | | |
|---|---|---|---|
| 3,079,837 | 3/1963 | Theilemann | 430/961 |
| 3,579,338 | 5/1971 | Ooue et al. | 430/21 |
| 3,607,276 | 9/1971 | Ooue et al. | 430/21 |
| 3,816,133 | 6/1974 | Weyde et al. | 430/21 |
| 3,839,038 | 10/1974 | Gracia et al. | 430/416 |
| 3,869,290 | 3/1975 | Philippaerts et al. | 430/568 |
| 3,885,966 | 5/1975 | Gracia et al. | 430/1 |
| 3,894,179 | 7/1975 | Jacobs et al. | 430/4 |
| 4,021,606 | 5/1977 | Takeda et al. | 358/130 |
| 4,059,445 | 11/1972 | Sato | 430/198 |
| 4,269,917 | 5/1981 | Drexler et al. | 346/135.1 |
| 4,304,848 | 12/1981 | Bouldin et al. | 430/21 |
| 4,314,260 | 2/1982 | Drexler | 346/76 L |

FOREIGN PATENT DOCUMENTS 2521671  11/1975  Fed. Rep. of Germany ...... 430/961

OTHER PUBLICATIONS

Jerome et al., "Home Video-Disk System Creates a New Image on Photographic Film", Electronics, Apr. 4, 1974, pp. 114–117.

*Primary Examiner*—J. Travis Brown
*Attorney, Agent, or Firm*—Sughrue, Mion, Zinn, Macpeak, and Seas

[57]            ABSTRACT

A recording medium for reflective readout in an optical information recording system. The medium comprises a substrate such as PET or PMMA on emulsion layer of silver halide material and an optical protective layer. The emulsion is exposed to a laser source to form a latent data image and is then developed to exhibit a glossy silver metallic image. Playback uses established systems.

6 Claims, 2 Drawing Figures

OPTICAL RECORDING MEDIUM

BACKGROUND OF THE INVENTION

This is a continuation of application Ser. No. 395,239, filed July 6, 1982, abandoned, which is a continuation of application Ser. No. 120,036 filed Feb. 11, 1980 abandoned.

This invention relates to optical recording systems, in particular, it relates to reflective readout in an optical recording system utilizing a disc plate or film as the storage media. Within the prior art, basic concepts of optical information storage and playback are well documented. A variety of systems have been proposed and described in the literature. For example, U.S. Pat. Nos. 3,501,586; 3,624,284; 3,795,902; 3,806,643 all relate to various systems utilizing optical scanners for digital information storage and playback. Basic descriptions of such systems are found for example, in "Optical Engineering, Vol. 15, No. 1, January/February 1976, Optical Digital Recording", J. T. Russell. Extensive descriptions of other basic systems are found in "Optical Readout of Video Disc", IEEE Transactions on Consumer Electronics, November 1976, p. 304; "Optical Disc Systems Emerge", IEEE Spectrum, August 1978, p. 20. Other examples of the prior art in optical information storage and playback are found in "The Philips 'VLP' System," Philips Tech. Rev. Vol. 33, No. 7, 1973, J. Compaan et al; "A Review of the MCA Disco Vision System," *J. SMPTE,* Vol. 83, July 1974, K. Broadbent; and SPIE Preceeding, Vol. 123 edited for Optical Storage Materials and Methods, p. 104 (1977), "An Optical Disc Data Recorder," R. McFarlane et al.

In its most basic form an optical video recording system utilizes laser light which both records and plays back from a single surface. Essentially, in most systems, laser light is passed from a source to a modulator which modulates the beam by rotation of its polarization in accordance with an applied voltage. In other systems, the laser output is modulated by changing the electrical input signal to the laser source. Other light conditioning then takes place such as attenuation which is used to reduce intensity during playback mode. Various scanning systems are used, such as the rotating scanning system as in the Russell patents or other techniques where the beam is either expended or focused to fill an area on the optical disc. The disc may be rotated or translated or relative motion can be effectuated by combination of those actions with movement of the lens. The laser light focused by the focusing lens is either used to record a track or is modulated during the playback process by an existing track and is then reflected along an optical path to a detector.

Although a variety of techniques have been employed to demonstrate the feasibility of optical recording utilizing a laser source, numerous problems remain which prevent commercial acceptance of this technique. One such key area of research is a suitable recording material. As indicated in prior art, a number of candidates exist although currently Bismuth or Tellurium are the materials of choice for vapor deposition on a substrate for optical plates. Essentially, two techniques are utilized. In a first, utilizing a quantum technique of recording photographic, photoresist or photochromic materials are used. In a second technique utilizing ablative thin films, the recording mechanism is essentially a thermal technique utilizing the absorbed energy from the focused laser beam as a localized heat source that by melting or vaporization changes the magnetization or degree of reflectivity of the surface.

The prior art "Optical Disc Systems Emerge" article lists a variety of candidates for optical recording materials. These candidates are listed as existing from photographic materials to electroptic materials. As set forth in that article, candidates have been identified and selected based on various criteria. The first is to compare resolution as a function of material sensitivity. As set forth in the article, an acceptable candidate to be used as a recording material should have a resolution capability of less than 1-$\mu$m to satisfy requirements of packing density. Exposure sensitivity is also considered so that the material utilized should permit the use of moderate to low power recording lasers yet be sufficiently insensitive in the case of repeated playback not to deteriorate the record. As set forth therein, for a 1-$\mu$m spot which is recorded at 10-MHz and exposure of $10^{-2}$ J/cm$^2$ can be achieved at 1 mW power level.

Considering these requirements, this prior art article concludes that exposure should be within the range of $10^{-2}$–$10^{-3}$ J/cm$^2$ with a resolution of greater than $10^3$ C/mm. Based on this criteria coupled with the fact that rapid correction of recorded information is necessary, the article concludes that photographic and photoresistant materials are not suitable candidates for recording materials.

Accordingly, the prior art has moved in the direction of utilizing either single layer plates utilizing low melting point metal with low thermo-difussitivity or multi-layer composite structures. In the case of single layer systems, candidate metal include Indium, Lead, Tellurium and Bismuth. As indicated herein, Bismuth and Tellurium appear to be the materials of choice.

In the case of multilayer coatings, reflectivity from the top surface of the recording medium can be eliminated and the pit formation process, that is the technique of recording digital data onto the recording medium can be designed to disrupt anti-reflection conditions. Such multilayer structures have been proposed utilizing either bilayer or trilayer configurations. These configurations tend to utilize aluminum reflective surfaces between thermal barriers and titanium as the recording layer. Accordingly, the prior art has rejected the use of the photographic materials and has moved in the direction of expensive single layer techniques or complicated composite layer systems which are relatively low in sensitivity. Reflective readout is preferred because of compactness in the size of the playback unit and simplicity in detection of the focusing condition.

Within the prior art, it is known that some photographic materials utilizing silver halide emulsions will exhibit metallic gloss images when they are properly physically developed. Examples of such processes are provided in U.S. Pat. No. 3,579,338. This patent relates to a process of making a metal-glossy image from an image which is composed of silver halide. This patented process relates to a variable contrast projection system as described in U.S. Pat. No. 3,475,096 in which an illuminating light beam is applied to the developed image for transmission and another beam for reflection from said image, which are then combined with each other and projected on a screen. These patents, while describing a projection process and a process for creation of the metal-glossy image utilizing silver halide, do not recognize or indicate the suitability of the glossy image to the area of optical digital recording and playback in which reflective readout is employed. It is also noted that the basic technology in information reproduction by conventional projection systems is quite different from that used in optical digital recording in which electronic signal processing is employed.

SUMMARY OF THE INVENTION

Accordingly, it is an object of this invention to provide a new optical recording and playback medium.

Another object of this invention is to provide for a new optical medium utilizing a recording material that exhibits sufficient sensitivity and resolution for use in optical recording.

Still another object of this invention is to provide an optical recording plate or film that is inexpensive yet highly accurate and allows for high packing densities.

A further object of this invention is to provide a new optical recording medium usable in a reflective readout mode yet has a high sensitivity sufficient to be recorded upon with a low to moderate powered laser.

A still further object of this invention is to provide for a recording medium that permits the use of moderate and low power recording lasers yet is relatively insensitive to repeated playback mode operation of the record information without deteriorating the quality of the data recorded thereon.

These and other objects of this invention are achieved by the use of a recording media utilizing silver halide emulsion for reflective readout in optical information recording in a playback system. The recording medium comprises basically three components: substrate, emulsion layer and protective layer over the emulsion layer. By proper developing, a silver image is formed in the emulsion layer and by physical development, the metallic silver is formed at the top of the protective layer or at the boundary of the protective layer and the emulsion layer or at both the top and boundary of the protective layer. The protective layer is utilized to increase resistance to scratching and eliminate the formation of contaminant particles such as dust on the emulsion layer. In terms of light reflection, only several percent reflection of incident light occurs from the areas where no silver is present yet, reflectivity of 10 percent or more is observed in the area where the metallic glossy silver is formed. Conventional techniques can be used for recording and playback of the digital data train.

This invention will be described in greater detail by reference to the accompanying drawings and the description of the preferred embodiments which follows.

DESCRIPTION OF THE PREFERRED EMBODIMENT

Figure 1:
FIG. 1 is a cross section view of a segment of the recording media in accordance with the present invention.

Referring now to FIG. 1, a cross section of the optical recording medium in accordance with this invention is shown. The medium comprises a substrate 10 which may be a glass or plastic base material. Typical plastic base materials are polyethylene terephthalate (PET), polymethyl methacrylate (PMMA) and polycarbonate (PK). It is important for substrates to demonstrate dimensional and thermal stability for accurate, high density digital recording. In a known manner, emulsion layer 12 formed of silver halide material is deposited on the substrate. The emulsion layer is exposed to form a latent image by means of a low power laser for data recordation. Subsequent development achieves the degree of reflectivity necessary for accurate readout. Development of the silver halide emulsion layer is done in accordance with the method taught in the U.S. Pat. No. 3,579,338. Another method to attain metallic glossy-silver halide emulsion layer yield metallic silver images when they are exposed after development to the atmosphere in the presence of oxidizing vapors. One example of such an oxidizing agent is $H_2O_2$. Following exposure to modulated light for data recording, a photographic material composed of silver halide emulsion is developed with a developer such as FUJI PAPITOL; commercially available for FUJI Photo Film Co., Ltd. The material is then held in a confined box of 125 liters containing 20 ml of 8% aqueous solution of $H_2O_2$. After 24 hours at room temperature with 80-90% relative humidity, a metallic glossy silver image is observed on the phtographic material.

Fine grain silver halide particles in the range of the 0.01 to $0.1\mu$ in diameter are suitable for use in this application. That is, in order to achieve necessary resolution, in excess of $10^{+3}$ C/mm such a fine grain particle can be used. Candidate materials are Kodak 120-02 and Type 649F materials. These materials are compatible with Ar, He-Ne and Krypton laser sources.

The protective layer 14 provides necessary insurance against scratching and contamination of the emulsion layer. The protective layer is composed of a gelatin, as is widely used in conventional photographic materials. However, it is optional and in some instances may be disregarded.

The emulsion layer is exposed by an appropriate low power laser for data recording to create a latent image. Development occurs in the manner consistently taught by U.S. Pat. No. 3,579,338 or in the manner in which recording material is exposed after development to the atmosphere with the presence of oxidizing agents.

Also, following exposure to create the latent image, the emulsion layer may be exposed in a sulphur compound to induce physical development of the nuclei in the layer. This is followed by conventional photographic development using typical wet processing such as fixing, rinsing and drying.

Figure 2:
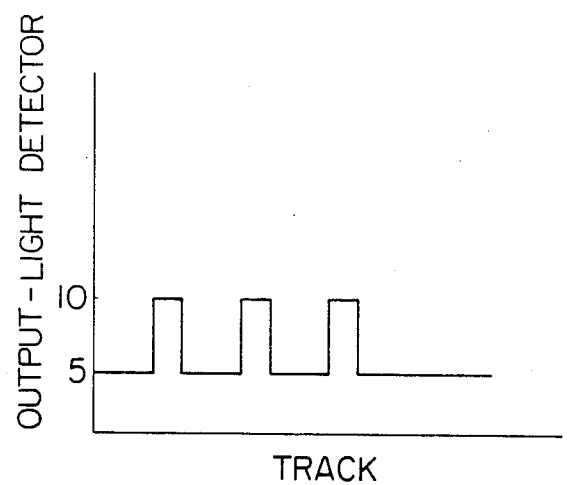
FIG. 2 is a graph showing the relative output of light as a function of the formed image.

As a result, as shown in FIG. 2, the areas where exposure takes place when developed exhibit a glossy silver, that is a metallic image. Light reflection in excess of 10% exits in the areas where the glossy metallic silver is formed while the remainder demonstrates light reflection in the order of 4 to 5%.

The glossy silver image may also be obtained by baking the material after conventional processing. A photographic plate in which silver halide emulsion with mean grain size of 0.05 $\mu$m is coated on a glass plate is exposed to modulated light to create the latent image and processed by conventional photographic development, fixing, rinsing and drying. The processed plate is held in an electric-powered oven maintained at 400° C. After 10 minutes, a metallic glossy silver image is observed on the photographic plate. A metallic glossy silver image is also observed when a plate is baked for 6 to 10 minutes at 380° to 400° C.

Playback of such a developed record follows techniques which are established in the art. Essentially, a low level laser source is used to illuminate the portion of the record. The light is focused into a very narrow, well defined spot as the record moves relative to the lens. The primary scanning is achieved by either rotating the record or rotating the scanning lens. The reflected image is directed back through the lens onto a beam splitter or the like and is then diverted onto a light detector.

As a variation of this invention, it is possible to deposit reflective materials other than silver onto the silver image which has been obtained by the processing as set forth herein. Accordingly, reflectivity can be further enhanced by subsequently deposition of materials onto the already processed silver image.

Other modifications of this invention are possible without departing from the essential scope therefrom.

We claim:

1. A method of optical data recording comprising the steps of, exposing a silver halide emulsion layer to modulated optical data by light focused by a focusing lens to form a latent image and developing said silver halide emulsion layer to form a reflective glossy metallic silver image having a light reflection greater than 10% on portions where said latent image exists.

2. The method of claim 1, further comprising the step of baking said glossy metallic silver image.

3. The method of claim 1, wherein the step of development comprises exposure of said emulsion surface to an oxidizing agent.

4. The method of claim 1, wherein the step of development comprises exposing said emulsion layer to a sulphur compound environment to induce physical development nuclei in said layer and subsequent photographic development.

5. A method of optical data recording comprising the steps of, exposing a silver halide emulstion layer to modulated optical data by light focused by a focusing lens to form a latent image, developing the latent image and, heating the developed image to form a reflective glossy metallic silver image having a light reflection greater than 10% on portions where said developed silver exists.

6. The method of claim 1 or 5 wherein the step of exposing a silver halide emulsion layer to modulated optical data includes the step of forming a latent image of digital data and wherein said glossy metallic silver image is an optical digital data recording.

* * * * *